Patented Sept. 11, 1951

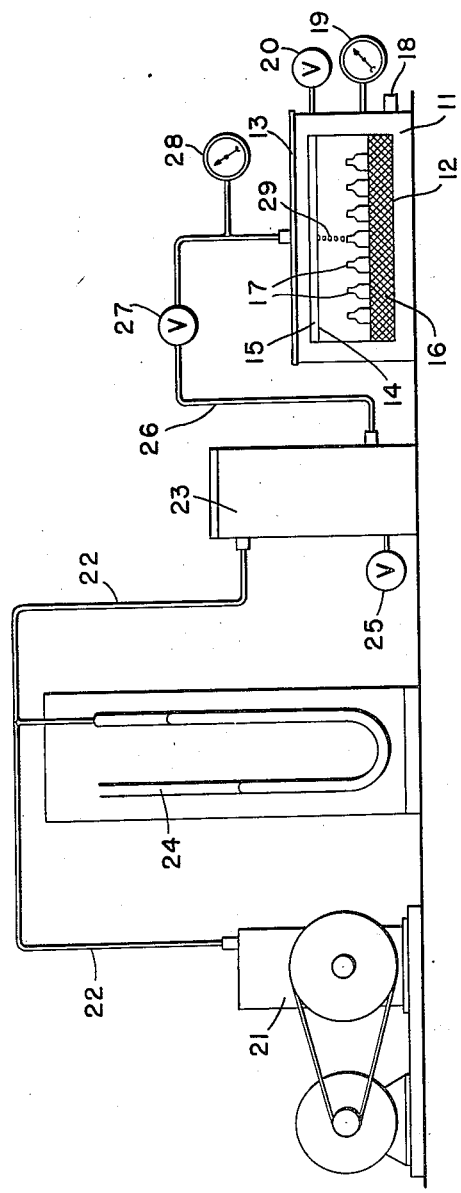

2,567,215

UNITED STATES PATENT OFFICE 2,567,215

APPARATUS FOR TESTING GAS LEAKAGE

Hyman Lacks, New York, N. Y.

Application May 26, 1948, Serial No. 29,316

2 Claims. (Cl. 73—40)

(Granted under the act of March 3, 1883, as amended April 30, 1928; 370 O. G. 757)

The present invention concerns apparatus for testing leakage of gas from a container and particularly concerns a method and apparatus for testing leakage of gas at very small rates from a pressure-filled container.

In the use of collapsible flotation equipment, such as life preservers, inflation of the equipment is conventionally accomplished by carbon-dioxide gas discharged into the equipment from small pressure-filled cylinders. The inflatable part of the preserver consists of two separate and independent compartments of equal capacity each equipped with an automatic inflation system consisting of a holder for a carbon-dioxide cylinder and an integral discharging device. The cylinder for the carbon dioxide is conventionally of about 0.735 inch diameter and 2.535 inches length with one end rounded and the other end reduced to provide a cylindrical discharge neck of about .343 inch diameter.

A cylinder has a capacity of slightly more than 10.5 cc. A filled cylinder contains not less than 7.7 grams nor more than 8.8 grams of $CO_2$. At normal temperatures and pressures, the pressure in the cylinder is about 900 pounds per square inch; at 212° F., a pressure of about 6500 pounds per square inch is developed in the cylinder. The cylinder, of seamless construction, has been designed to withstand a hydraulic pressure of 7000 pounds per square inch without bursting. Each cylinder is fitted with a steel sealing cap, electrically welded to the opening of the cylinder. The sealing cap (0.011+0.003 inch thick) is punctured for discharge of the carbon-dioxide gas contents by means of the discharging device, which is essentially a steel piercing point operated by a lever mechanism. In manufacture, after a cylinder is filled with carbon-dioxide gas under pressure it is necessary to test the cylinder for leakage in order that leaking cylinders be detected so that they can be discarded.

In accordance with conventional testing procedures, only one-tenth of one per cent of any lot of gas cylinders is selected for test for determination of rate of gas leakage and such leakage is limited to a maximum of 0.003 gram per 24 hours at room temperature and atmospheric pressure. Failure of any cylinder to pass this leakage requirement is cause for rejection of the lot it represents. The method used conventionally for detection of gas leakage is to find the difference in weight of the test cylinders before and after a period of 24 hours. This method of differences is entirely too slow and uneconomical for large-scale testing of the cylinders. In view of the fact that 999 out of any lot of 1000 cylinders are not tested for leakage under conventional testing procedures and inasmuch as the cylinders constitute an essential element of rescue equipment, it is necessary to have available an efficient method for leak testing of an adequate sampling of cylinders or possibly of all cylinders.

Prior to the invention disclosed herein numerous methods of testing for leakage of gas from a pressure-filled container were known. The most common method used for detecting leaks from a pressure vessel is to submerge the vessel in water and to observe the rise of bubbles. Obviously, only relatively large rates of leakage can be detected in this manner. A modification of this method, as commonly employed by plumbers and pipe fitters, consists in applying soapy water to an area of a pipe or vessel containing gas under pressure and suspected of containing a point of leakage; leakage can be detected by the formation of soap bubbles directly over the point or area of leakage. Only large rates of leakage can be detected.

A chemical method for testing leakage of carbon dioxide is also known. Carbon dioxide combines with barium hydroxide to form $BaCO_3$ which is very insoluble, i. e., only 0.0022 part by weight are soluble in 100 parts of water at 18° C. To use this test for detecting leakage, a $CO_2$-gas-filled cylinder is immersed in a saturated solution of barium hydroxide which is covered with a ¼ inch layer of kerosene to prevent $CO_2$-air contamination. The $CO_2$ gas when escaping from the cylinder at a rate of 0.0001 gram per hour reacts with barium hydroxide to give a visible precipitate in about one minute. This precipitate clings to the cylinder as a white pin-point at the point on the cylinder from which the gas escapes. This method is not practicable for large-scale testing for detection of leakage from $CO_2$-gas-filled cylinders because of the careful observation, handling and positioning of the cylinders necessary to detect the precipitate; because of the ease with which the barium hydroxide can become contaminated with $CO_2$ from the atmosphere; and because of the uneconomical use and wastage of barium hydroxide solution caused by its adhering to the cylinders immersed in it.

A thermal conductivity method makes use of a thermal gas concentration indicator to detect leakage. This indicator is essentially an instrument for measuring the thermal conductivity of gases, and can be calibrated to indicate the percentage of $CO_2$ in a specified volume. The indicator is not sufficiently sensitive to detect the smallest rates of leakage encountered from $CO_2$-gas-filled cylinders used with flotation equipment. Only large rates of leakage can be detected; the lowest rate of leakage that could be detected by this indicator was about 0.0009 gram per hour.

If the $CO_2$ gas within the cylinders were contaminated with a minute amount of helium gas during the manufacturing process, then leakage from a cylinder could be detected by means of a mass spectrometer. Such an instrument can be adjusted to detect a rate of flow of helium gas as low as 1 cubic centimeter in 16 years. In place of the helium gas, radium emanation can be introduced into the cylinders during the manufacturing process and then detected from leaking cylinders by means of a Geiger counter. A small amount of radium, about 1 milligram, could be made to serve as the source of the emanation, which could be introduced into the $CO_2$ gas during the filling operation. Since the emanation is very unstable, having a half-life period of 3.75 days, there is no danger inherent in its use. The expense of helium and radium methods and the slowness of the methods render them undesirable. Helium does not lend itself to a mass-production method. Radio-activity associated with radium renders the use of this material dangerous for personnel.

The present invention has overcome the disadvantages of prior methods by providing a novel test for leakage of gas from pressure-filled containers by submerging the test containers a substantial distance below the surface of a bath containing a surface-active agent, enclosing the bath in an airtight tank, controlling the temperature of the bath below about 70° F., and controlling the pressure above the bath at less than atmospheric pressure.

An object of the invention is to provide apparatus for testing leakage of gas from a container.

Another object is to provide apparatus for testing leakage of gas at a relatively slow rate from a pressure-filled container.

Another object is to provide apparatus for testing leakage of gas at a relatively slow rate from a pressure-filled container in which the container is submerged a substantial distance below the surface of a bath containing a surface-active agent. The bath is enclosed in an airtight tank. The temperature of the bath is controlled below about 70° F. and the pressure above the bath is controlled at less than atmospheric pressure.

Another object is to provide an apparatus for testing leakage of gas from a pressure-filled container comprising a tank having a first space for liquid and a second space for vapor at the top of the first space, said first space being adapted to be filled with a liquid bath including a minor amount of a surface-active agent, said bath being adapted to have a container submerged therein, a closure for said tank forming an airtight seal, means for controlling the bath at a temperature below about 70° F, and means for controlling the pressure at about one inch Hg absolute.

Further objects and advantages of this invention as well as the method steps involved and the construction and arrangement of the apparatus will be apparent from the following description taken in connection with the accompanying drawing in which the single figure is a diagrammatic view of a preferred embodiment of the apparatus of the invention.

There is shown a vacuum tank 11 having a window 12 formed in one side thereof. Preferably the side of tank 11 opposite to window 12 also is provided with a window (not shown) in order that light can be passed through the tank to illuminate the interior thereof. The tank can be of any desired size and satisfactory dimensions are found to be ten inches long by four inches wide by four inches high. The tank can be made of any suitable material and it is found that ¼-inch-thick steel plate joined together in a welded construction is satisfactory. Windows 12 can be made of any suitable transparent material and it is found that ¼-inch-thick plastic transparent sheets are satisfactory with each window being about 8½ inches long by 2 inches wide. As a closure for the top of tank 11 there is provided a removable cover 13, which is constructed in any conventional manner to provide an airtight seal with the top of tank 11.

The lower portion of tank 11 provides space for liquid bath 14 and the upper part of tank 11 provides a vapor space 15. The liquid bath can be of any suitable composition and in preferred form is a water solution containing a minor amount of surface-active agent in the amount of about 1%. Removably disposed in the lower part of tank 11 and adapted to be submerged a substantial distance below the surface of liquid bath 14 is a rack 16 adapted to hold test cylinders 17 that are to be tested for leakage. Rack 16 is disposed so that test cylinders 17 and liquid bath 14 thereabove are visible through observation window 12. Rack 16 can be of any suitable construction and it is found that use of $\frac{1}{16}$-inch-thick brass is satisfactory.

Associated with the lower part of tank 11 is a temperature control 18 adapted to control the temperature of liquid bath 14. Also associated with the lower part of tank 11 is a temperature indicator 19 adapted to afford a visible indication of the temperature of liquid bath 14. Associated with the top part of tank 11 is a pressure-relief valve 20 adapted when open to vent vapor space 14 to the atmosphere.

In communication with vapor space 15 is a pressure control system including a vacuum pump 21, connected by a conduit 22 with a drying tube 23. A mercury manometer 24 is connected with conduit 22 to indicate the perssure therein. A vent valve 25 is connected with the bottom of drying tube 23. A conduit 26 connects drying tube 23 with vapor space 15. A shutoff valve 27 is disposed in conduit 26 and a pressure indicator 28 is connected wtih conduit 26 between shutoff valve 27 and vapor space 15. Vacuum pump 21 is of any conventional construction and preferably is such as to be able to evacuate tank 11 to about one inch Hg absolute with bath 14 in tank 11. Drying tube 23 can be filled with suitable material such as silica gel in order to absorb water vapor from conduit 26 so that water vapor does not reach vacuum pump 21, because moisture absorbed in the oil of pump 21 prevents attaining a high vacuum.

The apparatus is conditioned for operation by removing cover 13 from tank 11. Bath 14 is poured into the lower part of tank 11. Rack 16 containing test cylinders 17 is lowered into the lower part of tank 11 so that cylinders 17 are submerged a substantial distance below the surface of bath 14 and so that test cylinders 17 are visible through observation window 12.

Cover 13 is secured in place on tank 11 to form an airtight seal. Relief valve 20 is closed. Temperature control 18 is adjusted so that bath 14 is brought to a temperature of about 70° F. as shown by temperature indicator 19. Drying-tube vent valve 25 is closed and shutoff valve 27 is opened. Vacuum pump 21 is operated to reduce the pressure in vapor space 15 below atmospheric pressure and preferably to a pressure of about one inch Hg absolute, as shown by pressure indicator 28 under which conditions shutoff valve 27 is closed. Bath 14 is retained at a temperature at about 70° F. and the pressure in vapor space 15 is retained at about one inch Hg absolute for a period of several minutes while observations are made through window 12. Leakage of gas from cylinder 17 is indicated as seen at 29 by a visible stream of bubbles moving upward from the point of leakage to the surface of bath 14. It is found that leakage can be detected at rates of leakage as slow as 0.0000024 gram per hour which is equivalent to a rate of leakage of 1 gram of gas in 48 years.

The mechanism in physical and chemical terms of the test for leakage is not entirely understood, since there are numerous factors involved and some of the factors are not predictable and explainable. One such factor is the nature of detachment of the bubbles of leaking gas from the point of leakage. There is a tendency for bubbles formed at the point of leakage to cling to the pressure-filled cylinder where clusters form and detach themselves at irregular intervals to provide an irregular bubble stream. It is unexpectedly found that by the use of the present novel method there is provided a stream of individual bubbles that increase in size to some extent from the point of leakage to the surface of the liquid bath. This arises at least in part from the fact that the bubbles do not cluster at the point of leakage but detach themselves individually and uniformly. Other factors include the speed of travel of each bubble from the point of leakage to the surface of the liquid bath, the length of the bubble stream from the leakage point to the liquid surface, the space between the individual bubbles in the stream, and the size of the individual bubbles. Additional factors are the pressure within the pressure-filled cylinder, the rate of leakage from the cylinder, foaming of the bubble stream at the liquid surface, diffusion of gas into solution into the liquid, viscosity of the gas and liquid, and forces acting on the bubble due to motion of the bubble through the liquid.

Regardless of the failure to understand completely the mechanism involved, the present invention provides the method steps and apparatus necessary to produce the new and unobvious result of making visible leakage of gas at a rate as slow as 0.0000024 gram per hour. Use of a surface-active agent in the liquid bath in a combination with temperature control of the liquid bath at about 70° F. together with pressure control in the space above the liquid bath and together with submerging of the test cylinders to a substantial depth below the liquid surface produces the novel result.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. An apparatus for testing leakage of gas from a pressure-filled container comprising a tank having a first space for liquid and a second space for vapor at the top of the first space, a liquid bath in the first space comprising a water solution having a minor amount of surface-active agent therein, said bath being adapted to have the container submerged therein, a closure for said tank forming an airtight seal, a side window in said tank extending from the top of the liquid space to substantially the bottom thereof, means for controlling the bath at a temperature below about 70° F., and means for controlling the pressure in the second space at about 1 inch Hg absolute.

2. An apparatus for testing leakage of gas from a pressure-filled container comprising a tank having a first space for liquid and a second space for vapor at the top of the first space, a liquid bath in the first space comprising a surface-active agent, said bath being adapted to have the container submerged therein, an observation port in said tank for exposing to view the first space, a closure for said tank forming an airtight seal, means for controlling the bath temperature and means for controlling the pressure in the second space.

HYMAN LACKS.

REFERENCES CITED

The following references are of record in the file of this patent:

UNITED STATES PATENTS

| Number | Name | Date |
| --- | --- | --- |
| 1,547,126 | Maede | July 21, 1925 |
| 2,108,176 | Newby | Feb. 15, 1938 |
| 2,228,122 | Lowey | Jan. 7, 1941 |
| 2,255,921 | Fear | Sept. 16, 1941 |
| 2,264,515 | Fear | Dec. 2, 1941 |
| 2,316,842 | Coleman | Apr. 20, 1943 |

FOREIGN PATENTS

| Number | Country | Date |
| --- | --- | --- |
| 362,015 | Germany | Oct. 21, 1922 |